Patented Feb. 20, 1951

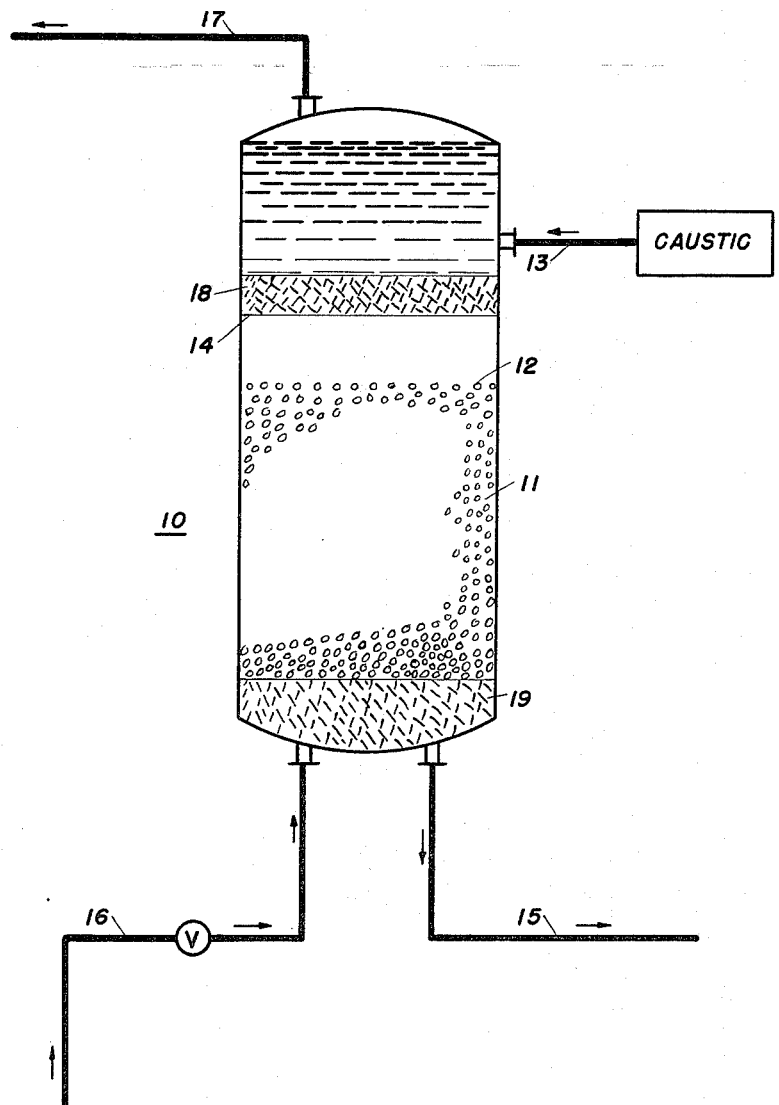

2,542,147

UNITED STATES PATENT OFFICE 2,542,147

EMULSION BREAKING

William A. Krewer, Ingleside, and George W. Ayers, Chicago, Ill., assignors to The Pure Oil Company, Chicago, Ill., a corporation of Ohio Application December 29, 1949, Serial No. 135,646

9 Claims. (Cl. 196—32)

This invention relates to a method of avoiding emulsification of hydrocarbons undergoing treatment with an alkaline solution, such as a solution employed for extracting mercaptans from the said hydrocarbon.

In the ordinary practice of processes for extracting or oxidizing mercaptans in hydrocarbons using alkaline solutions containing catalysts adapted to the oxidation, many factors are not subject to easy control and create operating difficulties at various stages in the process. Fundamental to the efficient operation of a hydrocarbon contacting process in a tower for example, is the development of effective and thorough liquid-liquid contact, and the maintenance of a stable liquid interface in the tower at a point above the packing therein. In order that the level may be maintained stable at a point in the tower for control purposes, it is necessary that there be little or no carry-over of the treating solution by the formation of emulsions with the hydrocarbon being treated. Experience has shown that when alkaline solutions or regenerated alkaline solutions are used in the contacting operations, almost invariably they will emulsify with the hydrocarbon in the extraction tower, often upsetting the equilibrium of the liquid-liquid interface to a substantial extent and causing carry-over of alkaline extracting solution into subsequent operating stages.

It is, accordingly, a fundamental object of the instant invention to provide a simple means for use in a contacting tower through which the level of the interface between hydrocarbon and the alkaline extraction or treating solution in the tower can be stabilized and maintained within desirable limits.

It is another object of the invention to provide an improved method of accomplishing hydrocarbon and alkali solution contact in a tower.

It is another object of the invention to provide in a hydrocarbon-alkali solution contacting operation a means for accomplishing the step and maintaining a clean-cut liquid-liquid interface.

Other objects and advantages of the invention will in part be obvious and in part appear hereinafter.

This invention, accordingly, involves the discovery that in hydrocarbon-alkali solution contacting processes, such as those wherein mercaptans are being extracted from hydrocarbons, the operation can be performed so that emulsification difficulties are avoided if certain comminuted materials, as exemplified by oil insoluble resin, such as polyethylenes and polystyrenes, are maintained in a layer preferably at the surface of the alkali solution and beneath the supernatant hydrocarbon, that is, at the interface between the two. The invention thus involves the steps and combinations of steps and their relationship each to the other which will be described hereinafter in greater detail in connection with the avoidance of emulsion difficulties in a treating tower, whereby a solid comminuted resinous material is employed to reduce the degree of emulsification encountered.

We have discovered that the emulsification produced upon contact between hydrocarbon and alkaline solutions for the extraction or oxidation of mercaptans in those hydrocarbons can be substantially prevented when the treating is carried out in a tower so that space is allowed for the stratification of the hydrocarbon and aqueous alkali phases, and a layer of comminuted particles of certain resins is maintained at the interface, the resins being preferably hydrocarbonaceous in nature, insoluble in the hydrocarbon, and preferably of a specific gravity which will cause them to float on the aqueous alkali, but sink in the hydrocarbon so that the material is retained automatically at the interface. The preferred example of resin suitable for the purpose is polyethylene in small particles of a size such that the current of hydrocarbon leaving the treating vessel will not be strong enough to carry them mechanically out of the device, but other resins, such as oil or hydrocarbon insoluble polystyrenes having an appropriate specific gravity in the range from about 0.9 to 1.1, will do.

Fundamental characteristics of the preferred resinous material are that it be essentially hydrocarbonaceous in nature to develop the appropriate surface for accomplishing the demulsification, and that it have a specific gravity in the range between that of the alkaline treating solution and the hydrocarbon undergoing treatment to permit it to float at the interface to accomplish the emulsion breaking effect. Though it is preferred that the resin be floated at the interface, heavier resins will do if they are held in the tower at a level corresponding to the location of the interface. The process, accordingly, contemplates a continuous extraction and regeneration or oxidation operation in which the alkaline treating solution is contacted with sour hydrocarbon, the hydrocarbon and aqueous phases separated, the aqueous alkali solution passed through the necessary sequence of regeneration steps, and the alkali solution recycled to the extraction stage of the process.

In the accompanying drawing, the figure is a diagram showing essentially a tower and the sequence of operations involved in the practice of the process.

Referring to the drawing, 10 represents a counter-current tower containing packing 11 to a level indicated as 12. Alkaline treating solution, including make-up and regenerated solution, is fed through line 13 to an upper section of the tower so that in the static condition, it would fill the tower to about the two-thirds mark as indicated by the level 14. Line 15 at the bottom of the tower represents a draw-off for taking alkaline solution to a regenerating operation. Line 16 represents a hydrocarbon feed to the tower through which it is pumped countercurrent to the alkaline material maintained therein, and line 17 represents the top discharge for the hydrocarbon. Shown, diagrammatically, floating on the alkaline treating material in the tower is a layer of resinous material 18 maintained at the interface in accordance with the invention.

Though it is preferred that the resin be floated at the level corresponding to the interface, it is apparent that, should the resin be too heavy, a screen mounted in the tower at about the level desired will hold the resin at the desired level. Also, it has been found that minimization of emulsification is accomplished when resin, like that maintained at the interface in the tower, is held at the hydrocarbon inlet to the tower as shown at 19. A further variant of the technique is to pack the tower with the resin.

In the operation of the process, sour hydrocarbon being fed into the packed tower for treatment by the particular alkaline solution used, will contact the alkaline material and have the sourness removed. Commonly, emulsification occurs in the passage of the hydrocarbon up through the packing to such an extent that alkali is carried off through line 17. However, with the maintenance of the layer of resinous material 18 at the interface, we have found that clear hydrocarbon containing substantially no entrained or emulsified alkali is taken off through line 17. Thus, in the tower under conditions defined in accordance with the invention, the phases in the tower will be an intimate mixture of hydrocarbon and alkali treating solution in the packed zone identified as 11, an intimate mixture of hydrocarbon and alkali practically as an emulsion in the zone defined between 12 and 14 at the top of the packing, and the bottom of the resinous layer. Demulsification occurs in the resinous layer and substantially clear hydrocarbon passes up into the space between resin 18 and out through discharge line 17.

As indicated, the resinous material is one which is preferably of hydrocarbonaceous nature and has the basic properties of being insoluble in hydrocarbons and inert toward the alkali solution. A typical material is polyethylene which should have a molecular weight of several thousand to insure its insolubility in a hydrocarbon. Similar considerations apply when it is desired to use oil insoluble polystyrene or the fluorinated hydrocarbon resins.

As examples of typical operations embodying the invention, the following are given:

*Example 1.*—A glass cylinder approximately 10 inches in height and 2 inches in diameter was filled to within two inches of the top with an alkali treating solution containing 18.3 parts of sodium hydroxide, 10 parts of meta-para cresol, 15 parts by weight of naphthenic acid, and 56.7 parts by weight of water. Sour raw gasoline was passed slowly into the extraction solution at the bottom of the cylinder through a porous connection. The raw gasoline in its passage up through the alkali treating solution gradually became emulsified therewith, with the result that there was first the disappearance of the clear interface, and a steady increase in the volume of emulsion appearing at the top of the alkali treating solution. Finally, within a relatively short time, emulsion filled the cylinder and carried over with the gasoline.

*Example 2.*—Using the same experimental technique, a layer of pieces of polyethylene resin, about 5000 molecular weight, in approximately 3 millimeter cubes, about a quarter inch deep, was placed on alkali solution in the cylinder. Treatment was carried out by passing raw sour gasoline up into the solution and it was found that the emulsion, formed in the alkali, was broken when it came in contact with the polyethylene resin, with the result that clear hydrocarbon came off from the top of the resin and passed out of the tower. An extended experiment running into several hours, produced the consistent result that substantially no emulsification above the resin was observed and, in addition, at the completion of the experiment, there was no appreciable decrease in the volume of the alkali treating solution remaining in the vessel. Thus, the resin was effective not only to reduce emulsification, but also to reduce entrainment of the alkali in the hydrocarbon solution and minimize loss of solution from the tower. The hydrocarbon coming off from the experiment was sweet.

Similar experimental determinations were made to evaluate the approximate amount of resin needed as a minimum useful quantity to apply in the process when treatment is carried out at a rapid rate. It is found that a layer of resin amounting in depth to about 5 to 10 per cent of the depth of the packing served to reduce the amount of emulsification appreciably so that stabilization of the hydrocarbon-alkali solution-interface in the tower was possible. However, when the amount of resin in the layer was increased to about 20 per cent of the depth of the packing, the amount of emulsification showed a marked decrease and when the resin layer was increased in depth to approximately 50 per cent of the depth of the packing, clear product left the tower and relatively little emulsification was observed above the resin layer. Further increase in the amount of resin created a condition whereby the hydrocarbon which appeared immediately above the resin in the tower was clear and had no entrained alkali solution. That is to say, it appears that when the amount of resin used at the interface between what should be the alkali solution and the supernatant hydrocarbon approaches approximately 50 per cent of the depth of the alkali used, such emulsification as may have occurred in the tower packing will be resolved within the resin layer and stratification will occur therein so that only clear hydrocarbon is seen above it.

The transfer of the operation from the model tower to a commercial tower operating on a large scale is direct, for experience indicates that the physical-chemical effect of the resin in breaking emulsions is not very sensitive to the variables of temperature and pressure. Since it appears to be essentially a surface effect, the physical factors involved in the operation are most important. That is to say, in a commercial scale operation, a reasonably deep layer of resin should be provided at the surface of the treating solution, and the layer of the resin floating on the alkali solution should be at least about 5 per cent of the total depth of the packing or alkali. A practical limit on the amount of resin which should be floated on the alkali is determined by the physical characteristics of the operation, and where a conventional packed tower is being used for the contact, the resin layer need not exceed about 30 to 40 per cent of the depth of the alkali solution as a maximum. This latter is not a rigid maximum figure, for it is possible to use large particles of resin to pack the tower and avoid having them float on the surface of the resin by supplying a screen to hold them in the bed of the tower. Thus, referring to the drawing, the packing 11 properly held in place by means of a screen if it were the resin, could serve not only as the packing, but also as the demulsifier, for the mechanical effect of mixing the hydrocarbon in the alkali solution and the physical-chemical effect of reducing emulsification can be attained simultaneously as well as successively. In general, the additional mechanical feature to be observed is that the particle size should be sufficient so that the mass of the individual particle is enough to resist its being carried off from the tower by the mechanical force of a hydrocarbon current rising therein. Normally particles of about 3 to 5 millimeters diameter represent a minimum size to be used.

In a semi-commercial operation employing a 12 foot tower having a diameter of 1 foot, using Berl saddle packing, experience indicates that a layer of the polyethylene resin about 6 inches deep maintained on top of the alkali treating solution, is adequate to cope with the emulsification problems encountered in average operating conditions where the treatment ratio calls for introduction of gasoline at a rate of about 550 gallons per hour per square foot of tower cross section.

As different embodiments of the invention may be made without departing from the spirit and scope thereof, it is to be understood that we do not limit ourselves to the specific embodiments thereof, except as defined in the appended claims.

What is claimed is:

1. In a process for treating sour hydrocarbons to convert them to a sweet state involving contacting the hydrocarbon with an essentially aqueous alkaline treating solution, the improvement comprising, maintaining in the treating zone an essentially hydrocarbonaceous resinous material insoluble in the hydrocarbon and in the treating solution at the level corresponding to that of the interface, contacting the hydrocarbon and alkali solution so that the hydrocarbon is passed through the layer of resin as it completes contact with the alkali solution, thereby substantially eliminating emulsification of the hydrocarbon and the treating solution.

2. The process in accordance with claim 1 in which the resin is a solid polyethylene hydrocarbon having a molecular weight of at least about 3000 to 5000.

3. The process in accordance with claim 1 in which the resinous material is a solid oil insoluble polystyrene resin having a molecular weight of at least about 3000 to 5000.

4. In a process for treating sour hydrocarbons to convert them to sweet state involving contacting the hydrocarbon with an essentially aqueous alkaline treating solution and separating them into an alkali solution and a hydrocarbon phase, the improvement comprising, maintaining in the treating zone an essentially hydrocarbonaceous resinous material insoluble in the hydrocarbon and in the treating solution at the level corresponding to that of the interface between the alkali solution and the hydrocarbon phase, and contacting the hydrocarbon and alkali solution so that the hydrocarbon is passed through the layer of resin as it completes contact with the alkali solution, thereby substantially eliminating the emulsification of the hydrocarbon and the treating solution, the amount of resin being such that it constitutes a layer at least 5 per cent of the total depth of the alkaline solution.

5. The method in accordance with claim 4 in which the particles of resin have a diameter of about 1 to 10 millimeters.

6. The process in accordance with claim 4 in which the resin is a solid polyethylene hydrocarbon having a molecular weight of at least about 3000 to 5000.

7. The process in accordance with claim 4 in which the resinous material is a solid oil insoluble polystyrene resin having a molecular weight of at least about 3000 to 5000.

8. In a process for treating sour hydrocarbons to convert them to a sweet state involving contacting the hydrocarbon with an essentially aqueous alkaline treating solution, the improvement comprising, maintaining in the treating zone an essentially hydrocarbonaceous resinous material insoluble in the hydrocarbon and in the treating solution at the point of entrance of the hydrocarbon to the treating zone, thereby substantially eliminating emulsification of the hydrocarbon and the treating solution.

9. In a process for treating sour hydrocarbons to convert them to a sweet state involving contacting the hydrocarbon with an essentially aqueous alkaline solution, the improvement comprising maintaining in the treating zone an essentially hydrocarbonaceous resinous material insoluble in the hydrocarbon and in the treating solution, so that the hydrocarbon and alkali treating solution mixture is contacted with the resin as it separates into the hydrocarbon and aqueous phases, thereby substantially eliminating the formation of stable emulsions of alkali solution in the hydrocarbon and removing clear hydrocarbon from the treating zone.

WILLIAM A. KREWER.
GEORGE W. AYERS.

No references cited.